United States Patent
Bratkovski (10) Patent No.: US 8,194,302 B2
(45) Date of Patent: Jun. 5, 2012

(54) ACTIVE CHIRAL PHOTONIC METAMATERIAL

(75) Inventor: Alexandre M. Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/638,182

(22) Filed: Dec. 15, 2009

(65) Prior Publication Data
US 2011/0141541 A1 Jun. 16, 2011

(51) Int. Cl.
- *G02F 1/01* (2006.01)
- *G02F 1/00* (2006.01)
- *H01S 3/00* (2006.01)
- *G03F 7/00* (2006.01)
- *H01L 29/06* (2006.01)

(52) U.S. Cl. ............ 359/240; 359/321; 359/342; 430/2; 257/21

(58) Field of Classification Search .......... 359/237–240, 359/299, 310, 321, 248, 342, 344–345; 29/602.1, 29/417, 846; 372/20, 28, 44.01, 50.1, 55; 250/306; 430/2, 21; 257/17, 21, 79, 417, 257/622
See application file for complete search history.

(56) References Cited

U.S. PATENT DOCUMENTS

| | | | |
|---|---|---|---|
| 6,608,811 B1 | 8/2003 | Holden et al. | |
| 6,791,432 B2 * | 9/2004 | Smith et al. | 333/99 S |
| 7,525,711 B1 | 4/2009 | Rule et al. | |
| 7,864,394 B1 * | 1/2011 | Rule et al. | 359/244 |
| 2007/0014006 A1 | 1/2007 | Tanaka et al. | |
| 2007/0215843 A1 | 9/2007 | Soukoulis et al. | |
| 2008/0218887 A1 * | 9/2008 | Deutsch et al. | 359/838 |
| 2008/0296710 A1 | 12/2008 | Tonucci | |
| 2009/0009853 A1 | 1/2009 | Tonucci | |

OTHER PUBLICATIONS

David J. Cho et al., "Ultrafast modulation of optical metamaterials," Optics Express, vol. 17, No. 20, Sep. 2009, 17652-17657.

M. Decker et al., "Circular dichroism of planar chiral magnetic metamaterials," Optics Letters, vol. 32, No. 7, Apr. 1, 2007, pp. 856-858.

J. S. Derov et al., "Free Space Measurements of Negative Refraction With Varying Angles of Incidence," IEEE Microwave and Wireless Components Letters, vol. 15, No. 9, Sep. 2005, pp. 567-569.

Douglas H. Werner et al., "Liquid crystal clad near-infrared metamaterials with tunable negative-zero-positive refractive indices," Optics Express, vol. 15, No. 6, Mar. 19, 2007, pp. 3342-3347.

Fuli Zhang et al., "Magnetically tunable left handed metamaterials by liquid crystal orientation," Optics Express, vol. 17, No. 6, Mar. 16, 2009, pp. 4360-4366.

(Continued)

Primary Examiner — Dawayne A Pinkney (57) ABSTRACT

An active chiral photonic metamaterial having a dynamically controllable photonic material parameter is employed in a system and a method of polarization rotation. The active chiral photonic metamaterial includes a first chiral photonic element formed in a first metal layer, a second chiral photonic element formed in a second metal layer, and an active material layer disposed between the first and second metal layers. The active material layer includes the photonic material parameter that is dynamically controllable. A coupling between the first chiral photonic element and the second chiral photonic element is a function of the photonic material parameter of the active material layer. The system further includes a means for controlling the dynamically controllable photonic material parameter. The method includes illuminating the active chiral photonic metamaterial with an optical signal and applying a control signal to vary the dynamically controllable photonic material parameter.

20 Claims, 4 Drawing Sheets

OTHER PUBLICATIONS

Y. Guo et al., "Planar Metamaterials Supporting Multiple Left-Handed Modes," Progress in Electromagnetics Research, Pier 66, 2006, pp. 239-251.

Hou-Tong Chen et al., "Active terahertz metamaterial devices," Nature Letters, vol. 444, Nov. 30, 2006, pp. 597-600.

Hou-Tong Chen et al., "Electronic control of extraordinary terahertz transmission through subwavelength metal hole arrays," Optics Express, vol. 16, No. 11, May 26, 2008, pp. 7641-7648.

Jiaguang Han et al., "Terahertz metamaterials with semiconductor split-ring resonators for magnetostatic tunability," Optics Express, vol. 16, No. 19, Sep. 15, 2008, pp. 14390-14396.

Evgenia Kim et al., "Modulation of negative index metamaterials in the near-IR range," Applied Physics Letters, vol. 91, 2007, pp. 173105-1 to 173105-3.

So-Noon Kwon et al., "Optical planar chiral metamaterial designs for strong circular dichroism and polarization rotation," Optics Express, vol. 16, No. 16, Aug. 4, 2008, pp. 11802-11807.

Oliver Paul et al., "Polarization-independent active metamaterial for high-frequency terahertz modulation," Optics Express, vol. 17, No. 2, Jan. 19, 2009, pp. 819-827.

E. Plum et al., "Metamaterial with negative index due to chirality," Physical Review B, vol. 79, 2009, pp. 035407-1 to 035407-6.

A. V. Rogacheva et al., "Giant Gyrotropy due to Electromagnetic-Field Coupling in a Bilayered Chiral Structure," Physical Review Letters, PRL 97, 2006, pp. 177401-1 to 177401-4.

Bingnan Wang et al., "Chiral metamaterials: simulations and experiments," J. Opt. A: Pure Appl. Opt., vol. 11, 2009, pp. 114003-1 to 114003-10.

* cited by examiner

ACTIVE CHIRAL PHOTONIC METAMATERIAL

CROSS-REFERENCE TO RELATED APPLICATIONS

N/A

STATEMENT REGARDING FEDERALLY SPONSORED RESEARCH OR DEVELOPMENT

N/A

BACKGROUND

A metamaterial is a composite material that derives a material property from a combination of its constituent element and its structure rather than exclusively from its bulk composition. In particular, metamaterials are manmade materials that generally comprise arrays (i.e., both periodic and aperiodic) of elements. The elements, which are usually much smaller than a wavelength of an excitation signal, act together to produce a collective response (or material response) to the excitation signal. For example, metamaterials that exhibit a negative index of refraction (so-called negative index materials (NIMs)), a material property that is not available in natural materials, have been demonstrated. Such metamaterials may be realized by a periodic structure that exhibits at certain frequencies both a negative permittivity $\in$ and a negative permeability $\mu$, for example. Metamaterials have a number of intriguing real-world applications including, but not limited to, producing a so-called superlens which may provide resolutions that exceed a standard diffraction limit at an operational wavelength, providing strong polarization rotation and even implementing "cloaking devices" that could make an object substantially invisible to incident electromagnetic radiation.

Metamaterials in both the microwave and optical domains have been demonstrated beginning with work by W. E. Kock in the 1940's. Kock developed metal lens antennas and metallic delay lines that, while not described at the time as such, essentially comprised metamaterials. Note that the term 'metamaterial' was first coined in 1999 by R. M. Walser and has been used only more recently to describe composite materials including, but not limited to, those developed by Kock and others prior to the 1990's.

Optical metamaterials have also been demonstrated. Optical metamaterials may be realized by constructing an array of elements with sub-wavelength dimensions that exhibit a response (i.e., resonance) to one or both of an electric field component and a magnetic field component of an optical excitation signal. N. Liu et al. and others have separately reported a number of examples of optical metamaterials comprising a periodic array of elements that exhibit relatively strong electric field responses. Such optical metamaterials that operate in the infrared and optical wavelengths are also known as photonic metamaterials.

Chiral metamaterials are a relatively new class of metamaterials that employ elements that are chiral. Chiral metamaterials often are more readily realizable, especially at optical frequencies. Bingham Wang et al., A. V. Rogacheva et al., Do-Hoon Kwon et al., and others have described various chiral photonic metamaterials comprising split-ring resonators and tetra-gammadions.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

Certain embodiments of the present invention have other features that are one of in addition to and in lieu of the features illustrated in the above-referenced figures. These and other features of the invention are detailed below with reference to the preceding drawings.

DETAILED DESCRIPTION

Embodiments of the present invention provide a metamaterial having controllable characteristics including a strong polarization rotation capability. In particular, the metamaterial includes an active layer sandwiched between layers of chiral structures facilitate controlling an amount of polarization rotation imparted to an electromagnetic signal passing through the metamaterial, according to various embodiments. For example, the electromagnetic signal may be an optical signal. In some embodiments, the active layer provides the controllability by affecting an amount or strength of a magnetoplasmonic coupling between the chiral structure layers. Specifically, one or more of a controllable carrier density, variable dielectric constant and another material parameter of the active layer may facilitate controlling the magnetoplasmonic coupling strength. The metamaterial with the active layer may have applications to various optical systems including, but not limited to, an antireflection structure, a super lens, and a polarization rotator.

In various embodiments of the present invention, the metamaterial comprises an active material layer that is sandwiched between metal layers having chiral photonic elements. The chiral photonic elements interact with an optical signal and with each other to affect a characteristic of the optical signal. The active material layer influences the interaction (i.e., electromagnetic coupling) between the chiral photonic elements. In some embodiments, the interaction induces a polarization rotation in the optical signal. In some embodiments, the induced polarization rotation is relatively stronger than a polarization rotation associated with the chiral photonic elements alone. In particular, the interaction between the chiral photonic elements and between the chiral photonic elements and the active material layer may enhance an effect that the metamaterial has on the optical signal.

In some embodiments, the interaction between the chiral photonic elements is a coupling that occurs through the active material layer. In particular, in contrast to metamaterials that employ only a single metal layer having chiral photonic elements, the chiral photonic elements of metal layers of the present invention are electromagnetically coupled to one another. Moreover, the coupling occurs through the active material layer and thus is directly influenced by characteristics of the active material layer.

In some of these embodiments, the coupling is a magnetoplasmonic coupling. A magnetic field of the magnetoplasmonic coupling interacts strongly with a magnetic field component of the optical signal to produce the effect on the optical signal, in some embodiments. Further, the magnetoplasmonic coupling between the photonic chiral elements that sandwich the active material layer occurs through the active material layer. As such, parameters, such as conductivity and dielectric constant, for example, directly influence the magnetoplasmonic coupling.

As used herein, a 'chiral element' is defined as a generally planar structure that cannot be exactly superimposed on a mirror image of itself (i.e., the structure is different from its mirror image). For example, a square spiral cannot be superimposed on a mirror image of the square spiral since forming a mirror image changes a rotational direction of the spiral. Other examples of a chiral element is a tetra-gammadion, a cyclic array of triangles, and a cross having curved arms in which all of the arms curve in a common direction. On the other hand, a straight cross or a symmetrical two-dimensional 'X' are not generally chiral. Also as noted above, herein a chiral element is defined as a generally planar structure. For example, the chiral elements herein are formed in or from a sheet or layer of metal. As such, the chiral elements embody a generally planar characteristic of the metal layer from which they are formed.

Further, as used herein, the article 'a' is intended to have its ordinary meaning in the patent arts, namely 'one or more'. For example, 'an element' means one or more elements and as such, 'the element' explicitly means 'the element(s)' herein. Also, any reference herein to 'top', 'bottom', 'upper', 'lower', 'up', 'down', 'front', 'back', 'left' or 'right' is not intended to be a limitation herein. Herein, the term 'about' when applied to a value generally means plus or minus 10% unless otherwise expressly specified. Moreover, examples herein are intended to be illustrative only and are presented for discussion purposes and not by way of limitation.

Figure 1:
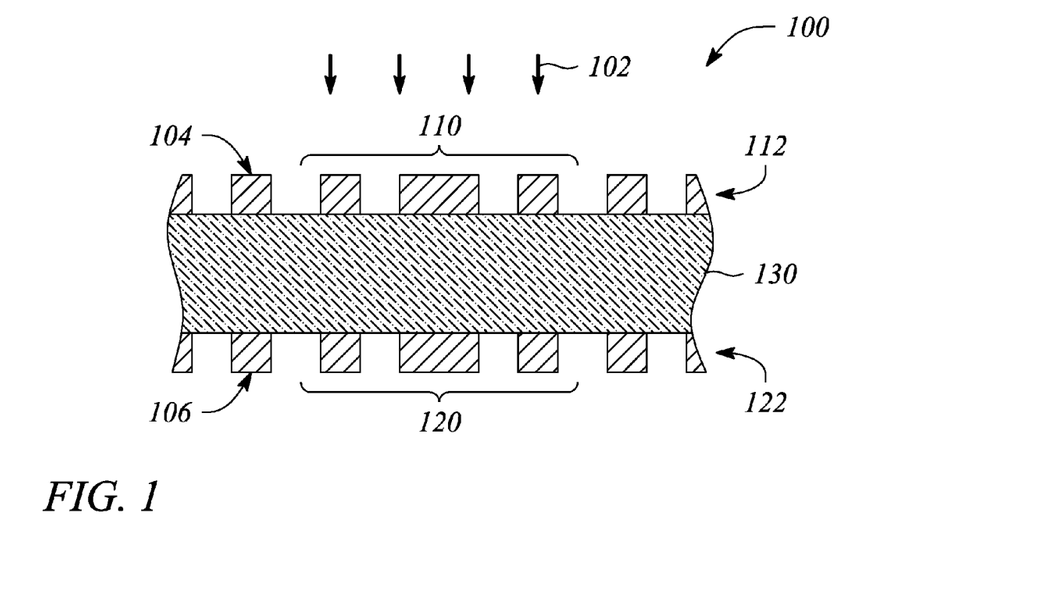
FIG. 1 illustrates a cross sectional view of an active chiral photonic metamaterial, according to an embodiment of the present invention.

FIG. 1 illustrates a cross sectional view of an active chiral photonic metamaterial 100, according to an embodiment of the present invention. In some embodiments, the active chiral photonic metamaterial 100 imparts a polarization rotation to an optical signal 102 passing through or traversing the metamaterial 100. In particular, an interaction between the optical signal 102 and the active chiral photonic metamaterial 100 results in a change in an angular orientation of a polarization component of the optical signal after passing through the metamaterial 100 relative to the polarization component of the optical signal 102 incident on a surface. In various embodiments, the optical signal 102 passes through the active chiral photonic metamaterial 100 from a front surface 104 to a back surface 106, as illustrated in FIG. 1. For example, the optical signal 102 may be incident from an angle less than 90 degrees from a surface normal of the front surface 104 of the active chiral photonic metamaterial 100.

In various embodiments, an interaction between the optical signal 102 and the active chiral photonic metamaterial 100 is controllable. In particular, a coupling between elements that make up the active chiral photonic metamaterial 100 is controllable in situ. In some embodiments, the controllable coupling is a magnetoplasmonic coupling between the elements.

In some embodiments, the in situ controllable coupling facilitates controlling an amount of polarization rotation imparted to the optical signal 102. In various embodiments, a control signal applied to the active chiral photonic metamaterial 100 provides control of the controllable coupling.

In some embodiments, the optical signal 102 may comprise one or more of an infrared (IR) optical signal or a visible optical signal. For example, the optical signal 102 may be an IR optical signal with a wavelength of between about 100 microns (μm) and about 700 nanometers (nm). In another example, the optical signal 102 may be an IR optical signal having a wavelength of between about 1.4 mm and 750 nm. The optical signal 102 may be centered at about 1.5 μm, for example. In yet other examples, the optical signal 102 may have a wavelength in the visible spectrum.

As illustrated in FIG. 1, the active chiral photonic metamaterial 100 comprises a first chiral photonic element 110. The first chiral photonic element 110 is formed in or from a first metal layer 112. In some embodiments, the first metal layer 112 comprises a noble metal. For example, the first metal layer 112 may comprise one of gold (Au) or silver (Ag). In other embodiments, a metal such as, but not limited to, copper (Cu) or aluminum (Al) may be employed as the first metal layer 112. In some embodiments, the first metal layer 112 has an overall thickness of between about 10 nm and about 100 nm. For example, the first metal layer 112 may be between about 20 nm and about 50 nm. In other embodiments, the first metal layer 112 may have an overall thickness that is greater than 100 nm.

The active chiral photonic metamaterial 100 further comprises a second chiral photonic element 120. The second chiral photonic element 120 is formed from or in a second metal layer 122. In some embodiments, the second metal layer 122 is substantially similar to the first metal layer 112. In particular, the second metal layer 122 comprises a noble metal such as, but not limited to gold (Au) and silver (Ag), according to some embodiments. In other embodiments, the second metal layer 122 comprises a metal such as, but not limited to, copper (Cu) or aluminum (Al). Likewise, in some embodiments, the second metal layer 122 has an overall thickness of between about 10 nm and 100 nm.

In various embodiments, the first chiral photonic element 110 and second chiral photonic element 120 have a chiral shape (i.e., are chiral structures). In some embodiments, the chiral shape of the first and second chiral photonic elements 110, 120 is formed from a portion of the first metal layer 112 and the second metal layer 122, respectively. In particular, the chiral shape comprises metal of the metal layers 112, 122. For example, the metal layer 112, 122 may be patterned and etched to remove metal except within a boundary of the chiral photonic element 110, 120. In some embodiments, an overall size (e.g. width and length) of the chiral photonic element 110, 120 is between about 100 nm and about 500 nm. For example, the chiral photonic element 110, 120 may have a length that is about 300 nm and a width that is also about 300 nm.

In other embodiments, the chiral shape of the first and second chiral photonic elements 110, 120 is formed from a portion of the first metal layer 112 and the second metal layer 122, respectively, that results in an aperture in (i.e., a hole through) the first and second metal layers 112, 122, respectively. Specifically, the aperture that is bounded by metal of the metal layer 112, 122 defines the chiral shape. For example, metal may be selectively removed (e.g., by etching) to form the chiral-shaped aperture in one or both of the first and second metal layers 112, 122. The chiral-shaped aperture is then the chiral photonic element 110, 120. An overall size (e.g. width and length) of the chiral photonic element 110, 120 comprising an aperture may be substantially similar to the overall size of chiral photonic element 110, 120 formed from or in a portion of the metal layers 112, 122, in some embodiments. For example, the aperture-based chiral photonic element 110, 120 may have a length that is about 200 nm and a width that is also about 200 nm.

Figure 2A:
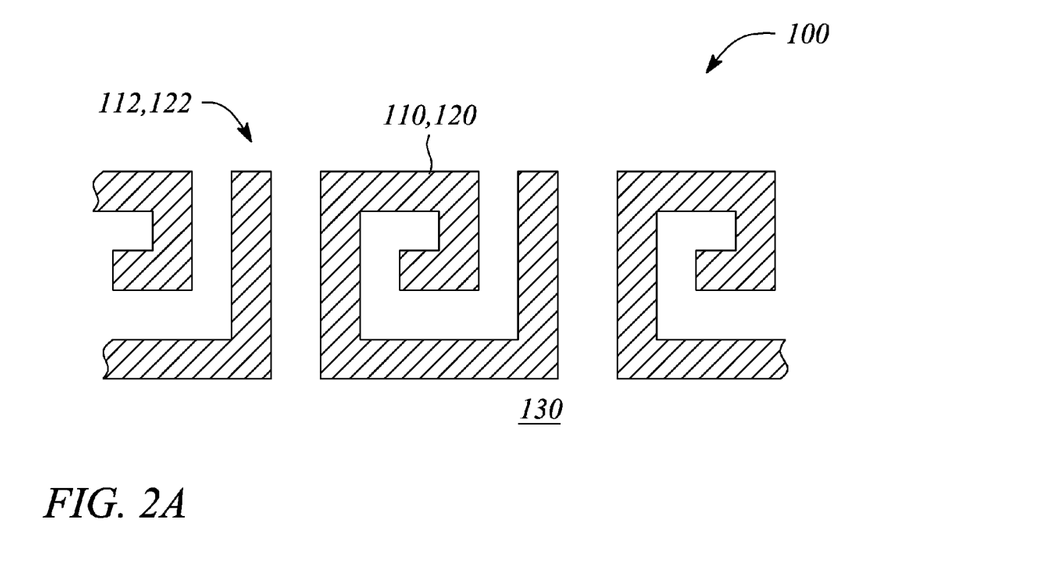
FIG. 2A illustrates a top view of an exemplary chiral photonic element, according to an embodiment of the present invention.
Figure 2B:
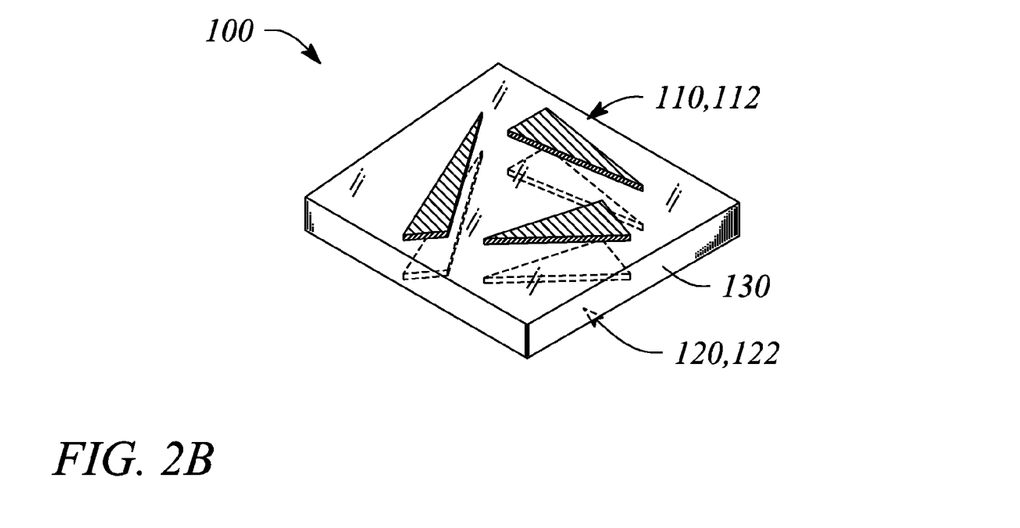
FIG. 2B illustrates a top perspective view of an exemplary chiral photonic element, according to another embodiment of the present invention.

FIG. 2A illustrates a top view of exemplary chiral photonic element 110, 120, according to an embodiment of the present invention. As illustrated, the chiral photonic element 110, 120 comprises a portion of the metal layer 112, 122 formed into a metal square spiral. FIG. 2B illustrates a top perspective view of an exemplary chiral photonic element 110, 120 according to another embodiment of the present invention. Specifically, the chiral photonic element 110, 120 comprises a cyclic array of triangular patches of metal. In particular, the first chiral photonic element 110 comprises three triangular metal patches arranged in a cyclic array, as illustrated in FIG. 2B. Further as illustrated, the second chiral photonic element 120 also comprises three triangular metal patches, albeit on a hidden or backside of the active chiral photonic metamaterial 100 illustrated in FIG. 2B. The three triangular patches of each of the first chiral element 110 and the second chiral element 120 are illustrated as both laterally and rotationally aligned. Thus, the first chiral element 110 and the second chiral element 120 of FIG. 2B are aligned with one another. In other embodiments (not illustrated), four, five or more triangular patches may be employed in the cyclic array.

Figure 2C:
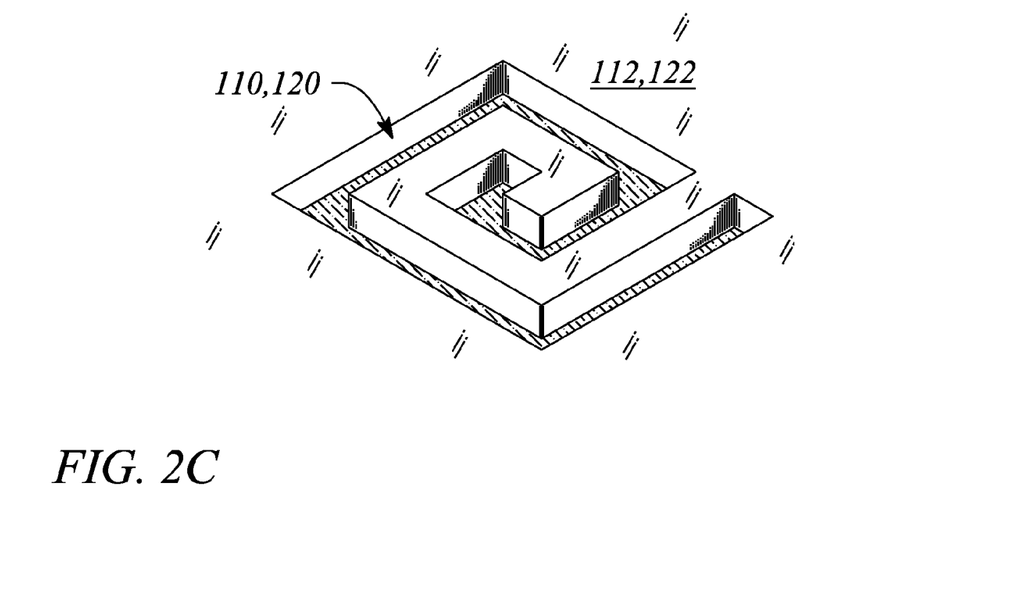
FIG. 2C illustrates a top perspective view of another exemplary chiral photonic element, according to yet another embodiment of the present invention.
Figure 2D:
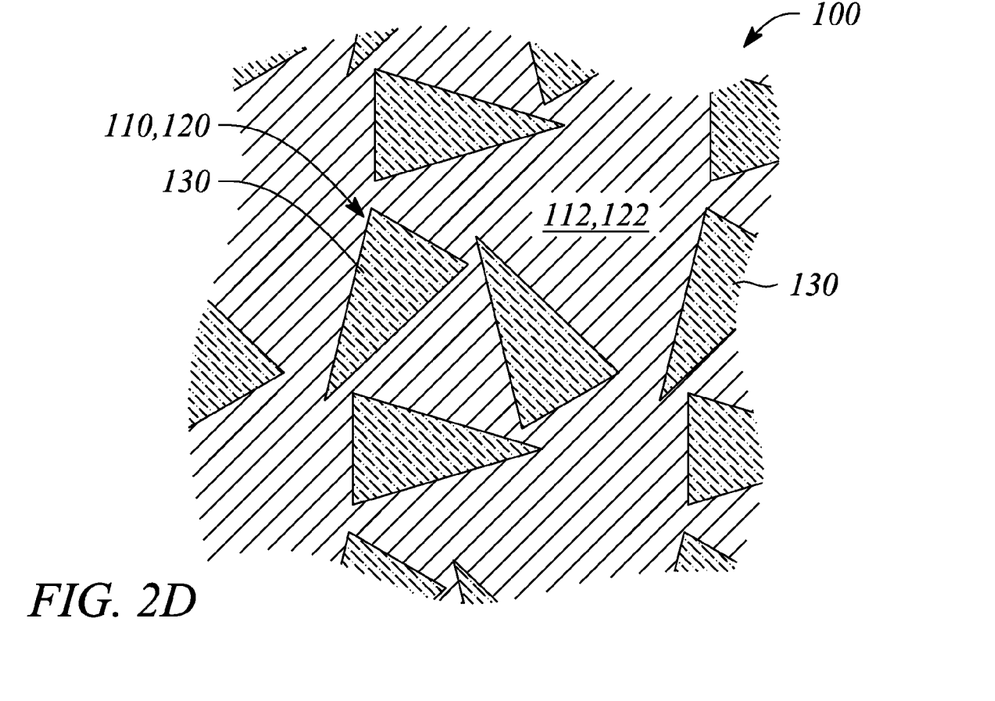
FIG. 2D illustrates a top view of an exemplary chiral photonic element, according to yet another embodiment of the present invention.

FIG. 2C illustrates a top perspective view of another exemplary chiral photonic element 110, 120, according to yet another embodiment of the present invention. As illustrated, the exemplary chiral photonic element 110, 120 comprises a spiral-shaped aperture formed in and bounded by a metal layer 112, 122. FIG. 2D illustrates a top view of an exemplary chiral photonic element 110, 120, according to yet another embodiment of the present invention. As illustrated in FIG. 2D, the chiral photonic element 110, 120 comprises a cyclic array of triangular apertures formed in and bounded by a metal layer 112, 122. In particular, three triangular apertures are illustrated in FIG. 2D. As with the cyclic array of metal patches, four, five or more triangular apertures may be employed in the cyclic array of triangular apertures, according to various other embodiments (not illustrated). Other chiral photonic elements (not illustrated) may have shapes, either in the form of patches or apertures, that resemble gammadions (e.g., a tetra-gammadion), round or archemidean spirals, various tapered and branched spirals, for example.

Referring back to FIG. 1, the active chiral photonic metamaterial 100 further comprises an active material layer 130. The active material layer 130 is disposed between the first metal layer 112 and the second metal layer 122. In some embodiments, the active material layer 130 has an overall thickness of between about 10 nm and 100 nm. For example, the active material layer 130 may be about 80 nm thick. In another example, the active material layer 130 may have a thickness between about 50 nm and about 90 nm. In other embodiments, the thickness is greater than 100 nm. For example, the thickness may be between about 100 nm and about 200 nm.

The active material layer 130 comprises a dynamically controllable photonic material parameter. In various embodiments, the controllable photonic material parameter of the active material layer 130 is dynamically controllable in situ in the active chiral photonic metamaterial 100. In particular, the dynamically controllable photonic material parameter is controllable in situ between the first and second metal layers 112, 122. The controllable photonic material parameter provides the in situ controllability of the active chiral photonic metamaterial 100, according to various embodiments.

In some embodiments, the coupling between the chiral photonic elements 110, 120 occurs through the active material layer 130. For example, magnetoplasmonic coupling may be provided by a displacement current in or through the active material layer 130. Changes in the controllable photonic material parameter may directly or indirectly influence the displacement current and affect the coupling.

In some embodiments, the dynamically controllable photonic material parameter may comprise a dielectric constant of the active material layer 130. The controllable dielectric constant may be controllable by application of an electric field across the active material layer 130 (e.g., by applying a voltage using the metal layers 112, 122 as electrodes), for example. In another example, the dielectric constant may be controllable by an optical field (e.g., optical signal) that is incident on or otherwise applied to the active material layer 130.

In other embodiments, the dynamically controllable photonic material parameter may be a carrier density of the active material layer 130. The controllable carrier density may influence a resistivity of the active material layer 130, for example. The influenced resistivity may change (e.g., reduce) a resonant response of the structure, for example. In yet other embodiments, the dynamically controllable photonic material parameter may be a physical change in the material. For example, the active material layer 130 may undergo a thickness change (e.g., by a piezoelectric effect or by MEMS) when a control signal is applied. The thickness change may change a spacing or a distance between the chiral photonic elements 110, 120 thus affecting the coupling, for example.

In some embodiments, the active material layer 130 comprises a semiconductor. In various embodiments that employ a semiconductor, the semiconductor may comprise a crystalline semiconductor, a polycrystalline semiconductor or an amorphous semiconductor. In some embodiments, the semiconductor comprises a group IV semiconductor such as, but not limited to, silicon (Si), germanium (Ge) and various combinations or alloys of Si and Ge and carbon (C) (e.g., SiGe, silicon carbide, or C-doped SiGe). For example, the active material layer 130 may comprise a layer of amorphous silicon (a-Si). In another example, the semiconductor may comprise a layer of crystalline Ge. In other embodiments, the semiconductor may comprise a compound semiconductor. For example, the compound semiconductor may comprise a group III-V compound semiconductor such as, but not limited to, gallium arsenide (GaAs), aluminum arsenide (AlAs), aluminum gallium arsenide (AlGaAs, $Al_xGa_{1-x}As$), indium arsenide (InAs), indium phosphide (InP), indium gallium arsenide (InGaAs, $In_xGa_{1-x}As$), indium gallium phosphide (InGaP), and various other binary, ternary, quaternary and quinary III-V compound semiconductors. In another example, the compound semiconductor may comprise a group II-VI compound semiconductor such as, but not limited to, cadmium selenide (CdSe), cadmium sulfide (CdS), cadmium telluride (CdTe), zinc oxide (ZnO), zinc selenide (ZnSe), zinc sulfide (ZnS), and zinc telluride (ZnTe). In yet another example, the compound semiconductor may comprise a group IV-VI compound semiconductor including, but not limited to, lead selenide (PbSe) and lead sulfide (PbS).

In some embodiments, the semiconductor is a doped semiconductor. For example, the semiconductor may be doped with either an n-type dopant or a p-type dopant. In some embodiments, the both an n-type dopant and a p-type dopant may be present. For example, the semiconductor may be doped to provide a p-n junction within the active material layer 130. In another example, the semiconductor may be doped to provide a p-i-n junction having an intrinsically doped or i-type layer disposed between the p-type and n-type doped regions of the semiconductor within the active material layer 130. In some embodiments, the semiconductor may comprise a plurality of semiconductors. For example, the semiconductor may comprise a heterojunction or form a heterostructure. The semiconductor may include a quantum well, for example. In particular, the chiral photonic elements 110, 120 may be substantially buried in a multiple quantum well (MQW) structure provided by the semiconductor of the active material layer 130, for example.

In another example, the semiconductor may be a quantum dot. The semiconductor quantum dot or dots may comprise one or more of PbSe, PbS, CdSe, CdS, InP and InAs, for example. The semiconductor quantum dots may be suspended in a matrix to form the active material layer 130, according to some embodiments. For example, the matrix may be a flowable oxide (e.g., an inorganic polymer) such as, but not limited to, FOx®-1x and FOx®-2x Flowable Oxides from Dow Corning Corporation, Midland, Mich.

In some embodiments, the semiconductor of the active material layer 130 is in direct contact with one of the first metal layer 112 and the second metal layer 122. In some embodiments, the semiconductor of the active layer 130 is in direct contact with both of the first and second metal layers 112, 122. For example, the semiconductor may form a Schottky junction with one or both of the first metal layer 112 and the second metal layer 122.

In some embodiments, 'electrical pumping' provides control of the dynamically controllable photonic material parameter while in other embodiments 'optical pumping' provides the control. For example, application of an electric field may be used as a means for electrically pumping the active material layer 130 to modulate a characteristic of the dynamically controllable photonic material parameter and affect coupling. An electric current may serve as another means for electrically pumping the active material layer 130, in another example. Exposing the active material layer 130 to an optical pump signal may be used to provide optical pumping, for example. For example, the optical pump signal may be at a wavelength different (e.g., shorter) than that of the optical signal 102.

In some embodiments, the first chiral photonic element 110 is one element of a first plurality of chiral photonic elements. In some embodiments, the first plurality is arranged as a 2-dimensional array. For example, the first plurality may comprise a plurality of first chiral photonic elements 110 arranged next to one another in a plurality of parallel rows. In some embodiments, the second chiral photonic element 120 is one element of a second plurality of chiral photonic elements. In some embodiments, the second plurality is arranged in a 2-dimensional array. In some embodiments, the first chiral photonic element 110 is aligned with the second chiral photonic element 120. For example, the first chiral photonic element 110 may have a lateral location and a rotational orientation that is substantially similar to the second chiral photonic element 120. In other embodiments, the first chiral photonic element 110 is one or both of rotated and laterally shifted (i.e., not aligned) with respect to the second chiral photonic element 120. For example, the first chiral photonic element 110 may be rotated 10 to 15 degrees relative to the second chiral photonic element 120.

In some embodiments (not illustrated), the active chiral photonic metamaterial comprises a plurality of active material layers interleaved between a plurality of metal layers, each metal layer having a corresponding chiral photonic element. For example, the active chiral photonic metamaterial may comprise three metal layers and two interleaved active material layers. In another example there may be four active material layers interleaved between five metal layers.

Figure 3:
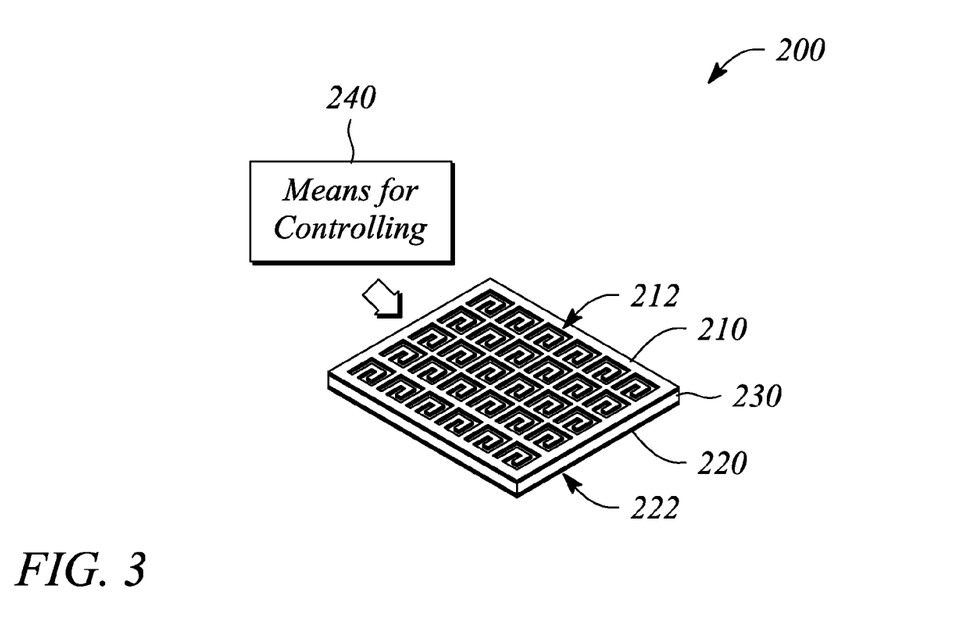
FIG. 3 illustrates a block diagram of an active photonic metamaterial system, according to an embodiment of the present invention.

FIG. 3 illustrates a block diagram of an active photonic metamaterial system 200, according to an embodiment of the present invention. The active chiral photonic metamaterial system 200 comprises a first metal layer 210. The first metal layer 210 comprises a 2-dimensional (2-D) array 212 of chiral photonic elements. The active chiral photonic metamaterial system 200 further comprises a second metal layer 220. The second metal layer 220 comprises a 2-dimensional (2-D) array 222 of chiral photonic elements. In some embodiments, the chiral photonic elements of the first metal layer 210 are aligned with chiral photonic elements of the second layer. The alignment may be one or both of lateral alignment and rotational alignment.

For example, the 2-D arrays 212, 222 may comprise a plurality of parallel rows and parallel columns that are arranged according to an X-Y grid of a Cartesian coordinate system. The chiral photonic elements of the 2-D arrays 212, 222 of each of the first metal layer 210 and the second metal layer 220 may be aligned at corresponding X-Y locations (i.e., laterally aligned) within the Cartesian coordinate system, for example. Honeycombs (i.e., hexagonal arrays) and triangular arrays are other examples of 2-D arrays (not illustrated).

In some embodiments, the metal layers 210, 220 may be substantially similar to the metal layers 112, 122 described above with respect to the active chiral photonic metamaterial 100. Likewise, the chiral photonic elements of each of the first metal layer 210 and the second metal layer 220 may be substantially similar to the chiral photonic elements 110, 120 described above. For example, the first metal layer 210 may comprise a 2-D array 212 of chiral photonic elements wherein each chiral photonic element is a square spiral aperture formed in the first metal layer 210 (e.g., as illustrated in FIG. 3). Similarly, the second metal layer 220 may comprise chiral photonic elements in the form of square spiral apertures arranged in a 2-D array 222, for example.

In another example, the 2-D arrays 212, 222 of chiral photonic elements of the first and second metal layers 210, 220 comprise 2-D arrays 212, 222 of spiral metal patches with a chiral shape.

The active photonic metamaterial system 200 further comprises an active material layer 230. The active material layer 230 is disposed between the first metal layer 210 and the second metal layer 220. The active material layer 230 has a controllable photonic material parameter. In various embodiments, the controllable photonic material parameter is dynamically controllable. In particular, dynamic control of the controllable photonic material parameter may be provided in situ, by definition according to various embodiments of the present invention. In some embodiments, a magnetoplasmonic resonance of the chiral photonic elements of the first metal layer 210 and the chiral photonic elements of the second metal layer 220 is function of the dynamically controllable photonic material parameter.

In some embodiments, the active material layer 230 is substantially similar to the active material layer 130 described above with respect to the active chiral photonic material 100. For example, the active material layer 230 may be a dielectric wherein the dynamically controllable photonic material parameter is a dielectric constant. In another example, the active material layer 230 comprises a semiconductor and the dynamically controllable photonic material parameter comprises a carrier density within the active material layer 230. In some embodiments, the semiconductor comprises quantum dots. In some embodiments, the semiconductor comprises one or more of the semiconductor materials listed above including, but not limited to, a compound semiconductor.

The active chiral photonic metamaterial system 200 further comprises a means for controlling 240 the dynamically controllable photonic material parameter of the active material layer 230. In some embodiments, the means for controlling 240 the dynamically controllable photonic material parameter comprises an electric source. For example, the electric source may be a voltage source. In another example, the electric source may be a current source.

The electric source means for controlling 240 may be connected to the first metal layer 210 and the second metal layer 220, in some embodiments. In other words, the first and second metal layers 210, 220 may be employed as electrodes by the electric source. For example, when the electric source is a voltage source, connection of the means for controlling 240 to the first and second metal layers 210, 220 may serve to provide an electric field across the active material layer 230. The electric field may be capable of controlling the dynamically controllable photonic material parameter of the active material layer 230, for example. Specifically, the electric field generated by application of voltage from the voltage source to the first and second metal layers 210, 220 may induce a change in one or both of a carrier density or a dielectric constant of the active material layer 230, for example. When the electric source is a current source, the current source may act as a source or a sink of carriers that affects a carrier density of the active material layer 230 by direct carrier injection or extraction, for example.

In some embodiments, the means for controlling 240 the dynamically controllable photonic material parameter comprises an optical source that provides an optical signal. In particular, the optical source means for controlling provides an optical signal to illuminate the active material layer 230 in a manner that affects the dynamically controllable photonic material parameter. In some embodiments, such as when the dynamically controllable material parameter comprises a controllable carrier density, the optical source provides an optical signal that, through an interaction with the active material layer 230, generates free carriers within the active material layer 230. The generation of free carriers controls the controllable carrier density, for example.

Figure 4:
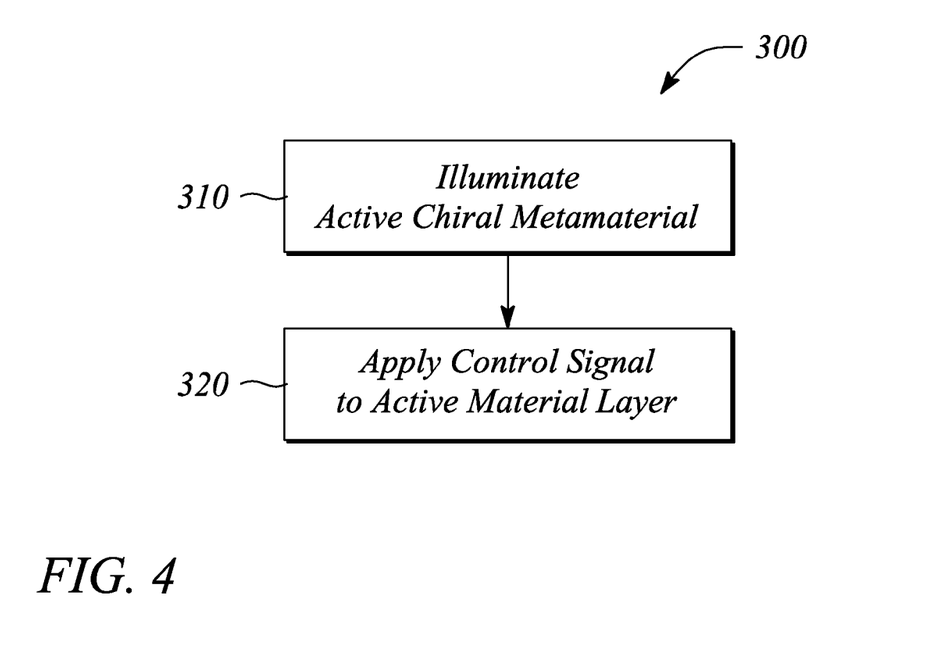
FIG. 4 illustrates a flow chart of a method of polarization rotation using an active chiral photonic metamaterial, according to an embodiment of the present invention.

FIG. 4 illustrates a flow chart of a method 300 of polarization rotation using an active chiral photonic metamaterial, according to an embodiment of the present invention. The method 300 of polarization rotation comprises illuminating 310 the active chiral photonic metamaterial with an optical signal. In various embodiments, the active chiral metamaterial comprises an active material layer disposed between a pair of metal layers. Each of the metal layers of the pair comprises a chiral photonic element. In various embodiments, the active chiral photonic metamaterial is substantially similar to the active chiral metamaterial 100, described above.

The method 300 of polarization control further comprises applying 320 a control signal to the active material layer. In various embodiments, the active material layer exhibits a dynamically controllable photonic material parameter. The applied 320 control signal controls the dynamically controllable photonic material parameter. In some embodiments, the dynamically controllable photonic material parameter comprises a carrier density of the active material layer. In these embodiments, the control signal varies the carrier density of the active material layer. Varying the carrier density varies a polarization rotation induced in the optical signal by the chiral photonic elements. In some embodiments, the active material layer comprises a semiconductor, where the carrier density is a carrier density in the semiconductor.

In some embodiments, the control signal comprises a bias voltage applied across the active material layer. For example, the bias voltage may be applied by a voltage source connected to the pair of metal layers. In other embodiments, the control signal comprises a current applied to the active material layer. In both embodiments that employ a voltage applied across the active material layer and a current source connected to the active material layer, the control signal is an electrical control signal that pumps the active material of the active material layer. The pumping may either increase or decrease the carrier density of the active material layer, for example. In yet other embodiments, the control signal comprises an optical signal that illuminates the active material layer. Illuminating the active material layer using the optical control signal optically pumps the active material layer. Optical pumping may create free carriers to change a carrier density of the active material layer, for example. In general, the optical control signal is a signal that is distinct from the optical signal that illuminates 310 the active chiral photonic metamaterial. For example, the optical control signal may have a wavelength that differs from a wavelength of the optical signal that illuminates 310 the active chiral photonic metamaterial. A laser that produces an optical beam that may be amplitude modulated, for example, may produce the optical control signal. Modulating the amplitude of the optical beam varies free carrier generation in the active material layer to dynamically control the carrier density, for example.

Thus, there have been described embodiments of an active chiral photonic metamaterial as well as a system and method that comprise the active chiral photonic metamaterial. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. An active chiral photonic metamaterial comprising:
   a first chiral photonic element formed in a first metal layer;
   a second chiral photonic element formed in a second metal layer; and
   an active material layer disposed between the first metal layer and the second metal layer, the active material layer comprising a dynamically controllable photonic material parameter,
   wherein a coupling between the first chiral photonic element and the second chiral photonic element is a function of the dynamically controllable photonic material parameter of the active material layer.

2. The active chiral photonic metamaterial of claim 1, wherein the first chiral photonic element is one of a first plurality of chiral photonic elements arranged in a 2-dimensional (2-D) array, and wherein the second chiral photonic element is one of a second plurality of chiral photonic elements arranged in another 2-dimensional (2-D) array.

3. The active chiral photonic metamaterial of claim 1, wherein the dynamically controllable material parameter is controllable by an electric field applied across the active material layer, the electric field providing electrical pumping of a material of the active material layer.

4. The active chiral photonic metamaterial of claim 1, wherein the dynamically controllable material parameter is controllable by an optical signal capable of optical pumping a material of the active material layer.

5. The active chiral photonic metamaterial of claim 1, wherein the active material layer comprises a semiconductor that is in direct contact with both of the first metal layer and the second metal layer, the dynamically controllable material parameter being a controllable carrier density of the semiconductor.

6. The active chiral photonic metamaterial of claim 5, wherein the semiconductor comprises one of silicon (Si), germanium (Ge), and an SiGe alloy, and wherein the metal layers comprise a noble metal.

7. The active chiral photonic metamaterial of claim 1, wherein one or both of the first chiral photonic element and the second chiral photonic element comprise a chiral metal structure formed from a portion of the respective metal layer.

8. The active chiral photonic metamaterial of claim 7, wherein the chiral metal structure comprises one of a square spiral and a cyclic array of triangular patches.

9. The active chiral photonic metamaterial of claim 1, wherein one or both of the first chiral photonic element and the second chiral photonic element comprise a chiral aperture formed in the respective metal layer.

10. The active chiral photonic metamaterial of claim 9, wherein the chiral aperture comprises one of a spiral-shaped aperture and a cyclic array of triangular-shaped apertures, the chiral aperture being bounded by the respective metal layer.

11. The active chiral photonic metamaterial of claim 1, wherein each of the first and second metal layers comprises one or more of a noble metal, copper (Cu) and aluminum (Al) metal with a thickness of between about 10 nanometers (nm) and 50 nm, and wherein the active material layer comprises a semiconductor having a thickness of about 50 nm to 90 nm.

12. An active chiral photonic metamaterial system comprising:
    a first metal layer comprising a 2-dimensional (2-D) array of chiral photonic elements;
    a second metal layer comprising a 2-D array of chiral photonic elements;
    an active material layer disposed between with the first metal layer and the second metal layer, the active material layer having a dynamically controllable photonic material parameter; and
    means for controlling the dynamically controllable photonic material parameter of the active material layer,
    wherein a magnetoplasmonic resonance of the chiral photonic elements of the first metal layer and the chiral photonic elements of the second metal layer is a function of the dynamically controllable photonic material parameter.

13. The active chiral photonic metamaterial system of claim 12, wherein the means for controlling the dynamically controllable photonic material parameter comprises an electric source connected to the first metal layer and the second metal layer to provide an electric field across the active material layer, the electric field being capable of controlling the dynamically controllable photonic material parameter of the active material layer.

14. The active chiral photonic metamaterial system of claim 12, wherein the dynamically controllable photonic material parameter comprises a controllable carrier density of the active material layer, and wherein the means for controlling the dynamically controllable photonic material parameter comprises an optical source that provides an optical signal to illuminate the active material layer, the optical signal being configured to generating free carriers within the active material layer by optical pumping to control the controllable carrier density.

15. The active chiral photonic metamaterial system of claim 12, wherein the chiral photonic elements of the first metal layer are aligned with corresponding chiral photonic elements of the second metal layer, the alignment comprising both of a lateral and a rotational alignment.

16. The active chiral photonic metamaterial system of claim 12, wherein the chiral photonic elements comprise chiral apertures formed in respective ones of the first metal layer and the second metal layer, and wherein the active material layer comprises a semiconductor.

17. The active chiral photonic metamaterial system of claim 16, wherein the semiconductor comprises quantum dots.

18. A method of polarization rotation using an active chiral photonic metamaterial, the method comprising:
    illuminating the active chiral photonic metamaterial with an optical signal, the active chiral photonic metamaterial comprising an active material layer disposed between a pair of metal layers, each metal layer of the pair comprising a chiral photonic element; and
    applying a control signal to the active material layer, the control signal varying a dynamically controllable photonic material parameter of the active material layer,
    wherein varying the dynamically controllable photonic material parameter varies a polarization rotation induced in the optical signal by the chiral photonic elements.

19. The method of polarization rotation of claim 18, wherein the chiral photonic element comprises a chiral aperture formed in the respective metal layers, and wherein the active material layer comprises a semiconductor, the dynamically controllable photonic material parameter comprising a carrier density of the semiconductor.

20. The method of polarization rotation of claim 18, wherein the control signal comprises a voltage applied across the active material layer by a voltage source connected to the pair of metal layers.

* * * * *